United States Patent [19]
Inai

[11] Patent Number: 6,055,565
[45] Date of Patent: Apr. 25, 2000

[54] INFORMATION INTEGRATED INDICATING METHOD, APPARATUS AND SYSTEM FOR USE ON THE WORLD WIDE WEB APPLIED TO DATA INSPECTION

[75] Inventor: Koji Inai, Kanagawa, Japan

[73] Assignee: Sony Corporation, Tokyo, Japan

[21] Appl. No.: 08/829,975

[22] Filed: Apr. 1, 1997

[30] Foreign Application Priority Data

Apr. 19, 1996 [JP] Japan .............................. PO8-098951

[51] Int. Cl.⁷ .................................................. G06F 17/21
[52] U.S. Cl. .......................................... 709/218; 707/104
[58] Field of Search .................... 395/200.48; 379/88.13, 379/902; 707/513, 531, 104; 434/307 R, 307; 709/218, 224

[56] References Cited

U.S. PATENT DOCUMENTS

| | | | |
|---|---|---|---|
| 5,572,643 | 11/1996 | Judson ..................................... | 709/218 |
| 5,761,673 | 6/1998 | Bookman et al. ...................... | 707/104 |
| 5,782,642 | 7/1998 | Goren ................................. | 434/307 R |
| 5,999,975 | 12/1999 | Kittaka et al. .......................... | 709/224 |

OTHER PUBLICATIONS

Tittel, Ed & James, Steve. "HTML for Dummies" 2d ed. (Foster City: IDG Books Worldwide, Inc. 1996) pp. 32–35 & 229–231, Apr. 1996.

International Standard, ISO 9660, "Information Processing–Volume and File Structure of CD–Rom for Information Interchange," First Edition Apr. 15, 1988.

*Primary Examiner*—James P. Trammell
*Assistant Examiner*—John Leonard Young
*Attorney, Agent, or Firm*—Limbach & Limbach, LLP

[57] ABSTRACT

An information display method and apparatus unifiedly displays at a client terminal unrenewal information together with renewal information which is acquired at any time from a server through a wide area network. A common page describing language is utilized with regard to positions of the renewal information and positions of the unrenewal information. The method and apparatus are particularly suitable for use with the World Wide Web.

14 Claims, 11 Drawing Sheets

INFORMATION INTEGRATED INDICATING METHOD, APPARATUS AND SYSTEM FOR USE ON THE WORLD WIDE WEB APPLIED TO DATA INSPECTION

DETAILED DESCRIPTION OF THE INVENTION

1. Background of the Invention

The present invention relates to an information integrated display method and device and an information integrated display applied to a document inspecting system and so on by using a network.

2. Prior Art

Conventionally, the CD-ROM is a read-only memory using, for example, a so-called compact disk (hereinafter called CD). The CD-I (the CD-Interactive) and so on have been used for information recording media for storing information such as documents and pictures. The document, sound, a moving picture, a still picture and so on are recorded on the CD-ROM and the CD-I as data files by using the same optical disk as the so-called compact disk that an audio signal is recorded, that is, the CD-DA (the Compact Disk-Digital Audio).

Furthermore, recently the so-called video CD that records a compressed and encoded moving picture signal on the same optical disk as the CD has appeared. As shown in FIG. 1, this video CD, falls under the category of the CD-ROM and is an extension of the so-called karaoke CD (the CD moving picture karaoke) in which an object is the simple moving picture playback. Still, the karaoke CD is an optical disk the main object of which is to use for karaoke which includes mixing an input sound signal from a microphone and a music signal.

As a CD-ROM, the adds video CD functions such as the still picture playback and the simple menu playback are added to the playback function of the digital moving picture. That is, for example as shown in Table 1, it is possible to provide, for example, over a wide range of musical software, educational software and electronic publication software in which the a moving picture is combined with the still picture, as well as the simple moving picture playback by adding the playback specification of the super fine still picture of 704×480 picture elements and the function of playback control by providing playback of the menu.

TABLE 1

| Physical Format: | CD-ROM (XA) |
| --- | --- |
| | Size of picture elements (the number of picture elements)/Frame frequency: |
| Digital Video: | Conformed to MPEG1 |
| | Size of picture element (the number of picture elements)/Frame frequency: |
| | 352 × 240/29.97 Hz (NTSC) |
| | 352 × 240/23.976 Hz (Film) |
| | 352 × 288/25 Hz (PAL) |
| | Data Transmitting Speed Maximum 1.152 Mbit/sec. |
| | Video Pack: 2296 bytes |
| Digital Audio: | MPEG1 Layer 2 |
| | Sample Frequency: 44.1 kHz |
| | Data Transmitting Speed: 224 kbit/sec and others |
| | Audio Pack: 2279 bytes |
| Playback Time: | Maximum 74 min. |
| The number of still pictures: | Standard Level: 352 × 240 |
| | Super fine Level: 704 × 480 |
| Playback Specification: | Menu playback using playback control such as usual playback, slow and pose. |
| Video Signal Output: | NTSC/PAL |
| Applied Field | Movie, Karaoke, Music, Education, Photo-Album |

The reference of the respective video CD is compatible with that of the existing CD-I FMV (Full Motion Video). That is, the reference of the video CD is the bridge reference that it is also possible to play back by a player corresponding to the reference of the CD-I FMV, thereby consistency of the reference and compatibility of the optical disk is held.

Further, as the video CD reference does not specify the operating system(OS) unlike the CD-I, it is possible to use for not only the dedicated player but also the personal computer and the game machine in which the moving picture board for the MPEG is loaded.

Further, the disk structure of the video CD conforms to the form 1 of the CD-ROM XA specification and control of the file follows to ISO9660 of the reference of International Standerization Organization.

Here, the recording area of the video CD, as shown in FIG. 2, is roughly classified into the read-in area, the data area (tracks 1 through 99) and the read-out area.

The track 1 is the video CD data track and new video CD data information part (INF VCD) is provided to the CD-ROM XA reference. The disk information, the list ID off-set table (LOT), the playback control (PBC) and so on are recorded to this video CD data information part as each kind of disk information. The IDs (the identifying information) of the moving picture and the still picture are stored into the list ID off-set table (LOT). Further, the playback procedure described by the list format is recorded to the playback control (PBC). The data such as the still picture used for the menu screen is written into the segment play part.

The CD-I application software part is also disposed to the track 1. When the disk of the video CD standard is played back by the CD-I FMV player, first the player reads this part and plays back according to the procedure of the application. Further, in case of playing back by the instrument necessary for the directory control of the personal computer and so on, the file is controlled according to the directory structure as shown in FIG. 3.

That is, in FIG. 3 the directory of the video CD shown as VCD in the figure is added to the conventional structure comprising CD-I, the MPEG audio, the video and the karaoke. For example, in the directory of the VCD of FIG. 3, the information of the video CD is stored into the INFO.VCD, the moving picture of the MPEG reference and the running position of the audio data of the MPEG reference are stored into the ENTRIES.VCD, the list off-set table is stored into the LOT.VCD in the figure and the information of the playback control is stored into the PBC.VCD in the figure.

Further, usual MPEGA data is recorded under the track 2 and it is possible to corresponds to the maximum track 99. However, in the video CD reference, it is possible to realize the disk to play back the super fine still picture by using not only the simple interactive software using the playback control but also only the track 1.

Next, the recording formats of the video CD and the video signal conform to the MPEG1. Usually, about 1.2 Mbit/sec is assigned to the video signal and about 0.2 Mbit/sec is assigned to the audio signal. The screen size to the picture, as shown in FIG. 4, is 352×240 picture elements in case of the NTSC signal (the frame frequency is 30 Hz) and is 352×288 picture elements in case of the PAL signal (the frame frequency is 25 Hz). The layer 2 of MPEG1 is used for the format to the audio signal. Though the audio signal of the representative MPEG is corresponding to the wide range of the encoding speed from 32 Kbit/sec. to 448 kbit/sec., it is limited to 224 kbit/sec. considering easy production and high quality of sound of the software in the video CD. Still, the playback mode is the stereo channel (2 channels), and it is possible to correspond to the using way for the so-called karaoke, for example, that music is recorded into the channel 0 and music and a singing voice is recorded into the channel 1.

Next, the track structure of the video CD is shown in FIG. 5. That is, on the disk, the MPEG video and the audio data are recorded by interleaving, and the video data and the audio data is disposed at the ratio of 6 to 1 as an average. Further, assuming a search by using the number of the track as is the case with the conventional CD player, 150 sectors are provided as a pose margin and 15 sectors are provided as a front margin and a rear margin respectively in order to reduce influence to a bit stream when searching.

Further, the sector format of the video data of MPEG, as shown in FIG. 6, includes a pack which includes a pack header and pack data. One pack comprises 2324 bytes that are the user data area of one sector of the CD-ROM.

However, 12 bytes are assigned as the pack header, 13 bytes are assigned as the packet header, 2279 bytes are assigned as the data part, 2324 bytes same as the video is one pack by adding 20 bytes of a surplus (recording zero). Still, in FIG. 6 PTS represents a presentation-time stamp, SCR represents a system clock reference and STD represents a system target decoder.

The sector format of the audio data of the MPEG is fundamentally same as the video data. However, 12 bytes are assigned as the pack header, 13 bytes are assigned as the packet header, 2279 bytes are assigned as the data part, 2304 bytes are one pack, 2324 bytes same as the video is one pack by adding 20 bytes of a surplus (recording zero).

If the optical disks such as the CD-ROM and the video CD are used for an information medium, it is possible to provide the document information such as letters and pictures to users. Particularly, in case of the video CD, it is possible to provide easily and cheaply moving picture information to users. However, in case of providing to the users by recording the information to those optical disks, there is a problem that given the time necessary to distribute the optical disks to the users (that is, a point of time when publishing the information), the information becomes old thereby reducing its value.

On the contrary, in the Internet, that is, the two way information system that introduced the so-called WWW (World Wide Web) system, for example, it is possible for users to acquire each kind of the latest information from providers of the information by dialogue format by using software known as a Browser. Still, the WWW is the information system that makes possible to inspect the information such as a text, a picture and a voice to be possibly used in the hypertext format. Further, the Browser of the WWW is the software that is necessary for using the WWW and is to display meeting a demand and to display the data from the network. That is, the Browser of the respective WWW reads the document described by the language for describing the hypertext format document called, for example, the HTML (Hyper Text Markup Language) from the terminal that the server or the Browser operates, edits and displays. Thus, in the system using the Browser of the WWW, transmitting is requested from the terminal to each server that is scattered at plural places and has information respectively, and it is possible to combine and display the information transmitted from each server on the side of the terminal. Further, the Internet is the computer network web that the computer network personnel of companies, universities and so on are connected through the wide area lines and are set up all over the world. Various services using the Internet such as the electronic mail service, the file transmitting service and the information searching service are frequently accessed. Further, the hyper text makes it easy to search the information by relating with the text, the drawing and so on, that is, by linking.

However, though it is possible to gather the information scattered at plural places on the side of the user's terminal, edit and display in the system for providing the information through the network to the user, it is only possible to edit and display the information supplied from the server on the side of the user's terminal. There are problems in that it is impossible to edit by burying the information on the side of the terminal into the document, for example, acquired from the server, to display, and to create the link for reference. Further, in case of acquiring the whole data that is comprised in the document and so on from the network, for example, when the information of a picture (particularly a moving picture) is included in the document, there are problems in that it takes a lot of time to acquire the information and load of the network is increased.

SUMMARY OF THE INVENTION

The present invention is executed considering the problems, and an object of the present invention is to provide an information integrated display method and device and an information integrated display system that it is always possible to provide the latest information, it does not take long time to acquire the information even if the information of a picture (particularly a moving picture) is contained in the acquired information, further, load of a network is a little and it is possible to edit and display by combining organically the information that a user's terminal itself has with the information that a server has.

An information integrated display method and device according to the present invention displays unifiedly a renewal information which is acquired from a server through a wide area network and is renewed at anytime and an unrenewal information which is individually held on the side of a client, the problems are solved by describing the position of each information which the displayed contents include by a common page describing language, and by displaying the renewal information acquired from the server by using a common language decoding display means and the unrenewal information held on the side of the client in the same display area.

Further, in an information integrated display method and system, the problems are solved by transmitting ID information specifying unrenewal information held on the side of a client to a server's side, by creating the related renewal information based on the transmitted ID information on the side of the server and returning to the client's side, and by displaying the renewal information acquired from the server's side and the unrenewal information held on the side of the client side in the same display area by using a common language decoding display means on the side of the client.

That is, according to the present invention, it is possible to reduce network load by using the information on the side of the client, to reduce necessity to sense remote or local when inspecting the document, and to provide a seamless environment by transmitting the optimal information suitable for the environment on the side of the client such as transmitting automatically with the information on the side of the client when accessing to the server, judging whether the server uses (burying of the information and so on) the information on the side of the client according to the information or not and burying the link information.

DETAILED DESCRIPTION OF PREFERRED EMBODIMENTS

An embodiment of the present invention will be described referring to drawings as follows.

Figure 7:
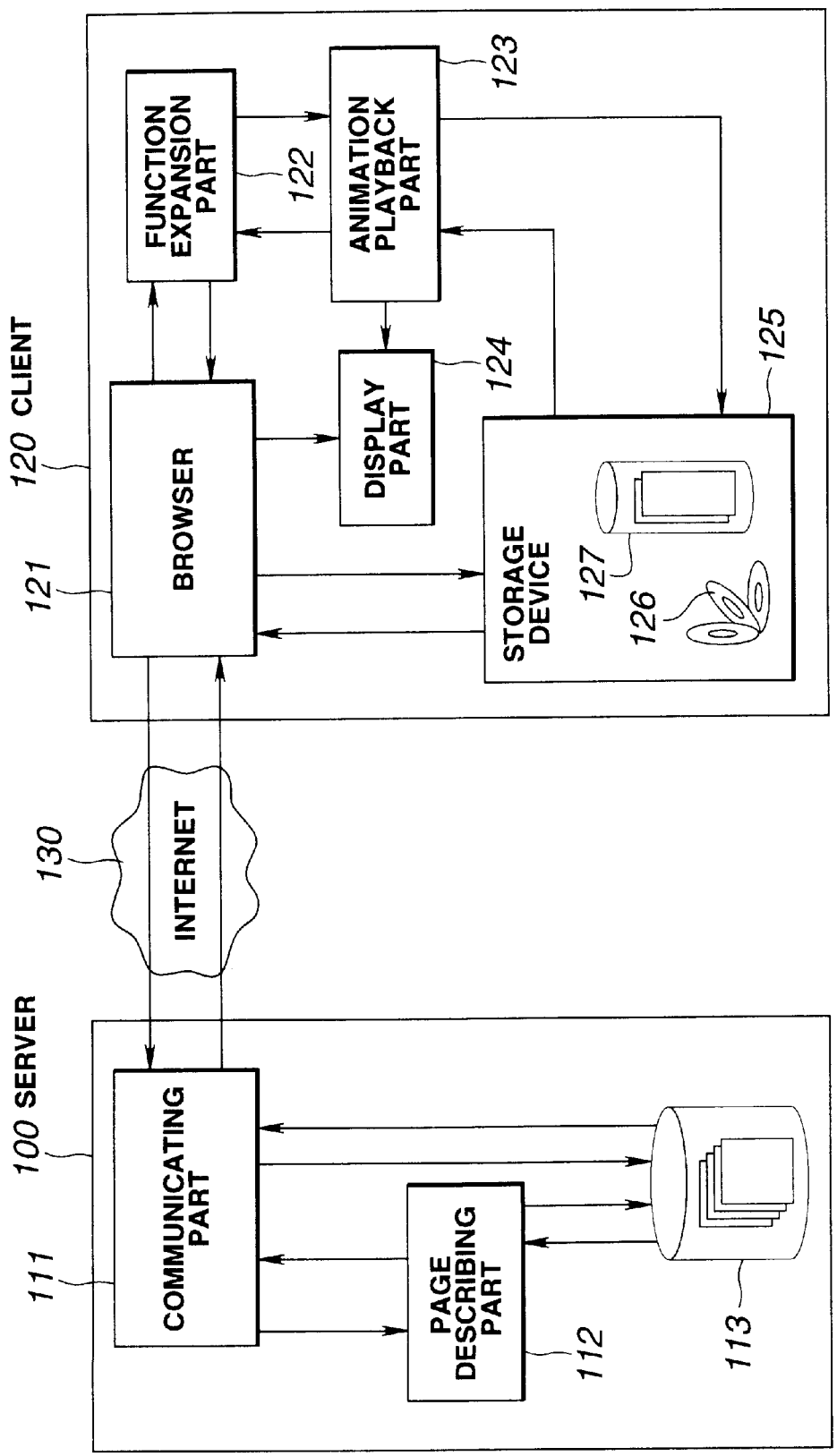
FIG. 7 is a block circuit diagram showing the system structure of an in formation integrated display system to which an information integrated display method and device according to the present invention are applied.

In FIG. 7, a schematic view of an information integrated display system to which the information integrated display method and device of the present invention are applied.

The information integrated play system as shown in FIG. 7, in order to display unifiedly a renewal information renewed at any time that is acquired from a server 100 through a wide area network such as the Internet 130 and an unrenewal information held individually on the side of an user terminal (the user terminal is called a client terminal 120 as follows) on an display device 124 of the client terminal 120, describes the position of each information which display contents include by a common page describing language and displays the renewal information acquired from the server 100 and the unrenewal information held on the side of the client terminal 120 in the same display area as the display device 124 by using a common language decoding display means. Still, both of the renewal and the unrenewal information includes information such as letters and pictures, therefore, in the following description, the letters and the pictures used by the server 100 and the client terminal 120, other file data, ID information and so on are named generally documents.

Figure 8:
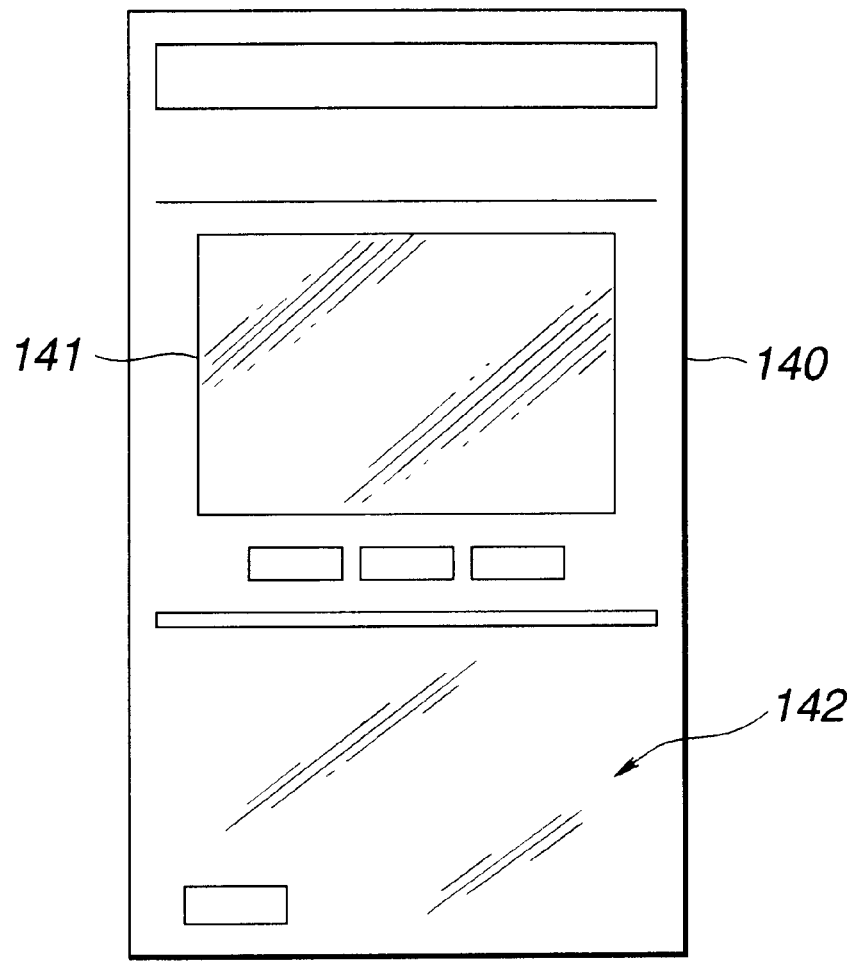
FIG. 8 is a view showing an example of a display area on an indicating device of a client terminal.

That is, in the information integrated display system of the embodiment of the present invention, it is possible to combine the document of the renewal information such as the letters and the pictures from the server 100 for searching and transmitting the document and the document of the unrenewal information such as the letters and the pictures of the client terminal 120 that is the terminal for inspecting that is connected with the respective server 100 and, as shown in FIG. 8, to display in the same display area 140 on the display screen of the display device 124. More concretely, in the system of the embodiment of the present invention, for example, the document information of the unrenewal information that is the information of the pictures that amount of data is large and a renewal period is comparatively long (particularly for a moving picture), unrenewal pictures and letters and so on is acquired from an optical disk 126 such as a CD-ROM and a video CD that is inserted into a storage device 125 of the client terminal 120. The information document of the renewal information such as the text information that the renewal period is short is acquired from the server 100 (is acquired through a network), and the display information including the letters and the pictures is created by combining the pieces of information and is displayed. In an example as shown in FIG. 8, for example, the MPEG moving picture (for example, a promotion video and so on) acquired from the optical disk 126 is displayed in the display area 141 in the same display area 140 of the display device 124, and the information (for example, a commentary of a movie, a movie theater, showing time, the latest information and so on) acquired from the server 100 is displayed in the display area 142.

In FIG. 7, for example, the HTTP (Hyper Text Transfer Protocol, native protocol used by the WWW for exchanging the hyper text through the Internet) server is used at a communicating part 111 of the server 100, and it is possible to use, that is to say, the CGI (Common Gateway Interface) program at the page describing part 112. Further, the renewal information that is renewed at any time includes the information of the letter mentioned in the page describing language called, for example, the HTML (Hyper Text Markup Language) and the picture.

One the other hand, a function extension part 122 of the client terminal 120 includes the Plug-in program, and a moving picture playback part 123 includes the MPEG1 decoder (hardware or software) and its software for controlling.

Further, the optical disk 126 inserted into the respective client terminal 120 is the CD-ROM, the video CD, or a hybrid video CD as mentioned below and so on and is played back by a storage device (for example, a disk drive device) 125. Therefore, the unrenewal information played back and acquired from the respective optical disk 126 is the letter and the picture information or the program data and so on in case that the respective optical disk 126 is the CD-ROM, and is the moving picture information decoded by the MPEG1 decoder in case of the usual video CD. The case in which the optical disk 126 is the hybrid video CD is described below.

Further, the unrenewal information includes, the information played back from the hard disk or the floppy disk loaded into them in case that the respective client terminal 120 has a HDD (a hard disk drive) or a FDD (a floppy disk drive), or the information (for example, the in formation acquired from the disk drive, the HDD and so on of other terminal)

supplied from an other terminal connected through the respective LAN in case that the client terminal 120 is connected by, for example, LAN (Local Area Network)as well as the information played back from the optical disk 126. Further, there is the case that the respective unrenewal information is mentioned in the page describing language of the HTML.

Further, a Browser 121 as the common language decoding display means at the server 100 and the client terminal 120 is possible to use the software for inspecting called the WWW Browser such as, for example, the Netscape Navigator (the trade mark) of Netscape Communication Co., Ltd., secures a display area 140 on the display screen of the display device 124 according to assignment of the displayed filename, the displayed file format and the displayed area, for example, described by the HTML, and are possible to display the unrenewal information and so on. Then, the Browser 121 also starts a necessary function of the Plug-in of the function extension part 122 preset according to the displayed file format that is described by the HTML. Still, it is possible to give, for example, the window of the netscape navigator as an example as the same display area on the display device 124 of the client terminal 120 in case of using this Browser 121.

As above mentioned, in the structure of the information integrated display system of the embodiment of the present invention, the document is expressed by the page describing language, for example, such as the HTML, however, in case of executing, for example, a description of burying the moving picture into the document by the respective HTML, it is possible to mention, for example, as follows.

<EMBED SRC-"file://vcd/mpegav/movie01.dot" WIDTH=320 HIGHT=240>

The part enclosed by double quotation marks (") following to the SRC shows the filename of the displayed moving picture and WIDTH and HIGHT show the size of the area secured for burying the moving picture into the document. That is, in case of this example, the area is 320 picture elements wide (in the horizontal direction) and 240 picture elements length (in the vertical direction).

Therefore, the Browser 121 of the client terminal 120 of the system in FIG. 7, in the case of detecting (judging by the EMBED tag) the description in the HTML file, secures the area for the Plug-in on the document according to the WIDTH and the HEIGHT and executes layout of the document. Further, it delivers URL (the data filename for burying) indicated by the SRC to the Plug-in of the function expansion part 122. Still, the URL is abbreviation of the Uniform Resource Locator, and is the description for assigning the other person and the using protocol in accessing to the information source through Internet. For example, the URL described as http://WWW.AAA/BBB/CCC.html means to copy (or have copied) (download through the Internet) the file named CCC stored under the directory named BBB of the server (host) named WWW.AAA according to the protocol of http.

The Plug-in of the function expansion part 122 gives instruction to display the moving picture in the area secured by the Browser 121 to the moving picture playback part 123 according to the received filename.

Further, for example, the information such as mouse operation executed in the secured area is transmitted to the Plug-in of the function expansion part 122 and the respective Plug-in gives instruction such as playing back and stopping to the moving picture playback part 123 according to the operation.

The moving picture playback part 123 opens the moving picture file from the storage device according to the filename given by the Plug-in of the function expansion part 122 and displays the moving picture at the fixed place on the display screen of the display device according to the instruction of the Plug-in.

Figure 9:
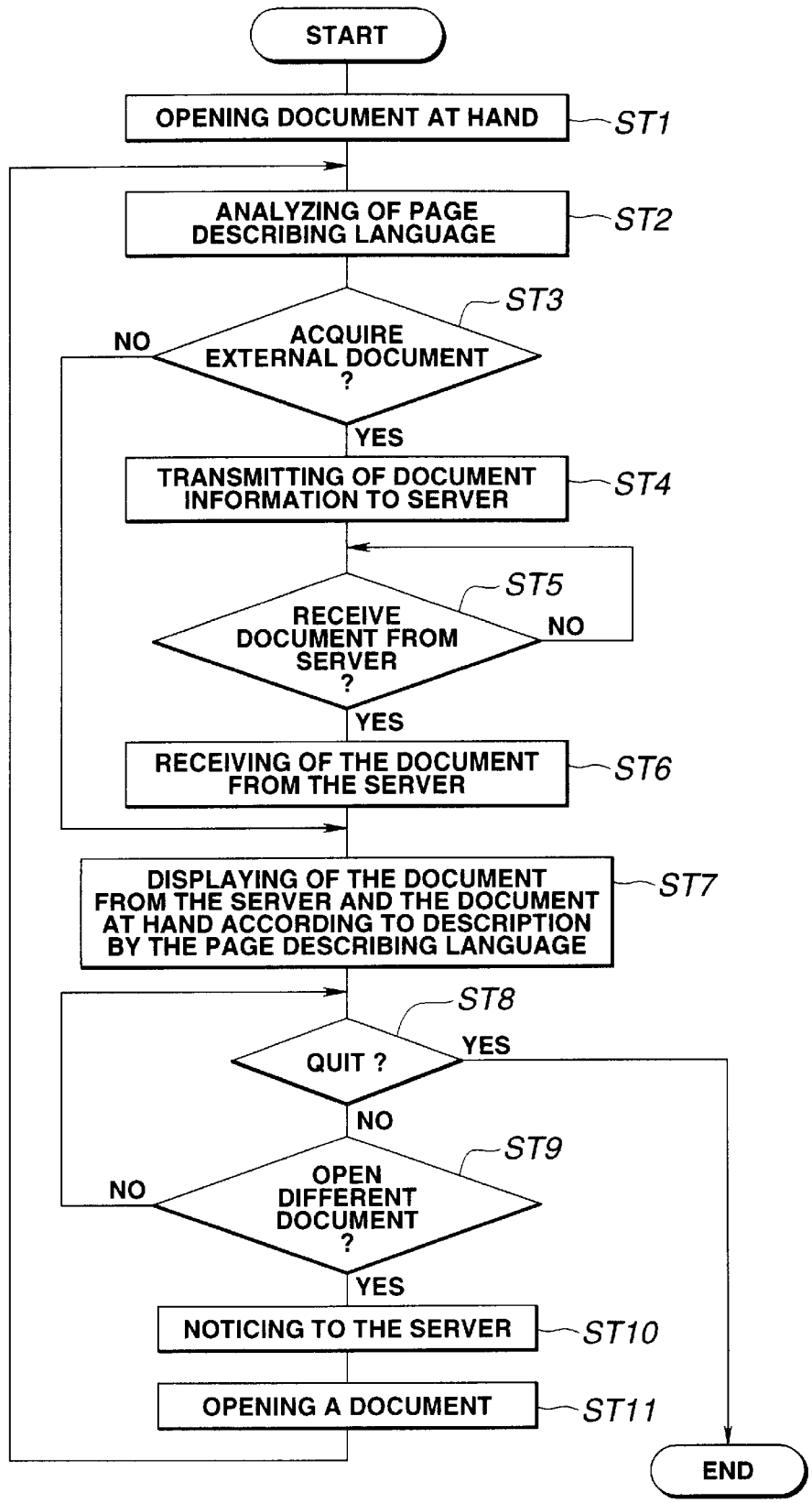
FIG. 9 is a flowchart of operation on the side of a client terminal.
Figure 10:
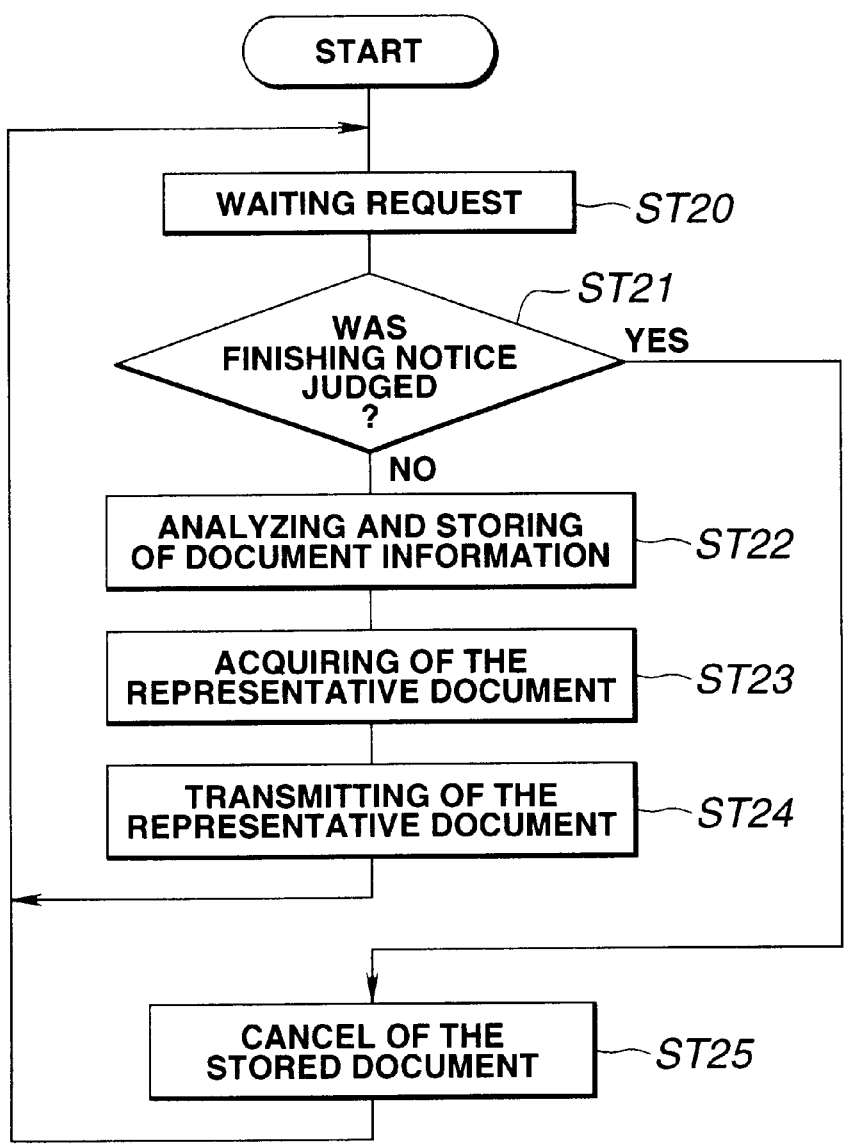
FIG. 10 is a flowchart of operation on the side of a server.

More detailed operation of the information integrated display system is described by using flow charts FIG. 9 and 10. FIG. 9 shows the operation on the side of the client terminal 120 and FIG. 10 shows the operation on the side of the server 100.

First, as a process for opening a document at hand at the step ST1 in FIG. 9, for example, the optical disk 126 is inserted into the storage device (the disk drive) 125. Or, it is possible to read the prescribed information from the prescribed area of the inserted optical disk 126 and to contain the process up to storing into a document data storing part 127 into the process to open the document at hand. Here, when the page describing language file such as, for example, the HTML is recorded in, for example, the prescribed area of the optical disk 126 as the prescribed information, the respective describing language is analyzed at the step ST2.

Next, when the instruction that an external document as well as the respective unrenewal information should be displayed at the same time is acquired in displaying the document of the unrenewal information recorded on the optical disk 126 on the display device 124 as a result of analyzing the page describing language, the judging process for acquiring the external document at the step ST3 is judged as Yes. Or, when the instruction that an external document as well as the respective unrenewal information should be displayed is acquired in displaying the document of the unrenewal information recorded on the optical disk 126 on the display device 124 in case that the page describing language is recorded on the optical disk 126, the judging process for acquiring the external document at the step ST3 is also judged Yes. Still, when judging as No at the step ST3, it proceeds to the process of the step ST7 as below described.

When judging as Yes at the step ST3, as shown at the step ST4, the document information is transmitted from the respective client terminal 120 to the server 100. Here, when analyzing the page describing language at the step ST2, the acquired page information is transmitted to the server 100 as the document information. Further, in case that the page describing language is not recorded on the optical disk 126, for example, the information (for example, the contents of information, the created date, a drive name, the ID of an inserted disk and so on) at hand of the respective client terminal 120 at the Browser 121 and the ID information showing the position and so on are transmitted to the server 100 as the document information.

Then, the communicating part 111 of the server 100 is waiting request from the client terminal 120 as the step ST20 of FIG. 10.

When receiving transmission from the client terminal 120 at the step ST20 of FIG. 10, the respective server 100 executes the processes from the step ST22 to the step ST24 until receiving the notice of finishing transmitting at the step ST21. At the step ST22, for example, the document information received from the client terminal 120 is analyzed at the communicating part 111, and the respective received document information is stored into the document data storage part 113 if necessary. For example, in case that the document information from the respective client terminal 120 is the page information, the respective page is analyzed at the communicating part 111, the document information corresponding to the description of the respective page is acquired from the document data storage part 113 at the step ST23, further, the page is created at the page describing part 112 and is transmitted with the document information from the document data storage part 113 from the communicating part 111 to the client terminal 120 at the step ST24.

Further, in case that the document information received from the client terminal 120 is the ID information and so on, the respective ID information and so on are analyzed at the communicating part 11, and the document information corresponding to the result of analysis of the ID information and so on is acquired from the document data storage part 113 and is transmitted with the page created at the page describing part 112 from the communicating part 111 to the client terminal 120.

The processes from the step ST20 to the step ST24 at the server 100 are repeated until receiving the notice of finishing transmitting from the client terminal 120 at the step ST21. Further, if the notice of finishing transmitting from the client terminal 120 is received at the step ST21 and it is instructed that the information stored into the document data storage part 113 may be canceled, it returns to be waiting request of transmitting of the step ST20 after canceling the respective storage information at the step ST25.

Returning to FIG. 9, it is judged whether the document information is received from the server 100 at the step ST 5 at the Browser 121 of the client terminal 120. Then, if not received yet, the judge of the step ST5 is repeated, when received, all the document information from the server 100 is received at the step ST6 and the respective received document information is stored into, for example, the document data storage part 127 once.

At the step ST7, the page information of the document information that is received from the server 100 and is stored into the document data storage part 127 is analyzed at the Browser 121, layout is executed according to the description of the page, and combination of the document of the letter and the picture from the server 100 with those from the optical disk 126 and so on is displayed on the display device 124 according to the layout.

Further, if starting of the Plug-in is necessary, starting of the Plug-in is executed at the function expansion part 122. Here, when starting of the Plug-in is executed, the moving picture playback part 123 is started at the respective started Plug-in and the moving picture data played back from the storage device 125 is displayed at the fixed position according to the description of the page by the respective moving picture playback part 123.

Next, the Browser 121 is under the state of waiting the user's operation and when the user operates something, the Browser 121 executes it. It is judged whether transmitting and receiving of the document and the process of the display is finished or not at the step ST8 as the state of waiting the user's operation, when it is judged that it is not finished, it proceeds to the step ST9. At the step ST9, it is judged whether a different document is opened or not, for example, switching of the page is executed or not similarly under the state of waiting the user's operation. When it is judged that the different document is not opened at the step ST9, it returned to the step ST8, and when it is judged that the different document is opened, the notice is executed to the server 100 at the step ST10. Then, the information noticed to the server 100 depends on the user's operation and is various of IDs of titles and user's names stored into the optical disk 126.

After that, it executes the process of opening the document at the step ST11 and returns to the process after the step ST2.

Next, the hybrid video CD that can be used to the embodiment of the present invention will be described.

As above mentioned, the storage device 125 of the client terminal 120 is a disk drive device that is possible to playback the optical disk 126 such as the CD-ROM and the usual video CD. Here, the reference of the video CD is conformed to the CD-ROM XA reference, therefore, it is possible to read the respective video CD similarly to the usual CD-ROM by a personal computer and so on. Therefore, in the system of the embodiment of the present invention, the video CD in which the data and the application software as well as the moving picture and the sound data used for the conventional video CD used for the personal computer and so on such as the CD-ROM are recorded is also used. Thus, as the video CD used for the embodiment of the present invention includes the functions of the conventional video CD and the CD-ROM, it will be particularly called the hybrid video CD in the following description. In the hybrid video CD used for the embodiment of the present invention, it is possible to correspond to the title taken out as an individual package by one disk by using respectively the same material as the conventional video CD and the CD-ROM by recording the data and the application software used for the personal computer and so on with the moving picture and the sound data, and is also possible to reduce load on the side of the software control of the disk playback device (the disk drive) if using this hybrid video CD. Further, as it is possible to use the hybrid video CD to the personal computer and so on, it is possible to add the function that it was impossible to realize by the conventional video CD and is possible to extend the range of the applications.

The format of the hybrid video CD used for the embodiment of the present invention will be described. In the recording format of the hybrid video CD, the moving picture data area in which the moving picture data that can be played back as the conventional similar video CD is recorded and the application area in which the data and the application software used for the personal computer and soon such as the CD-ROM is recorded are disposed. Here, for example, the Plug-in of the Netscape Navigator and the HTML data that should be displayed by the Netscape Navigator are recorded in the application area of the respective hybrid video CD.

Figure 11:
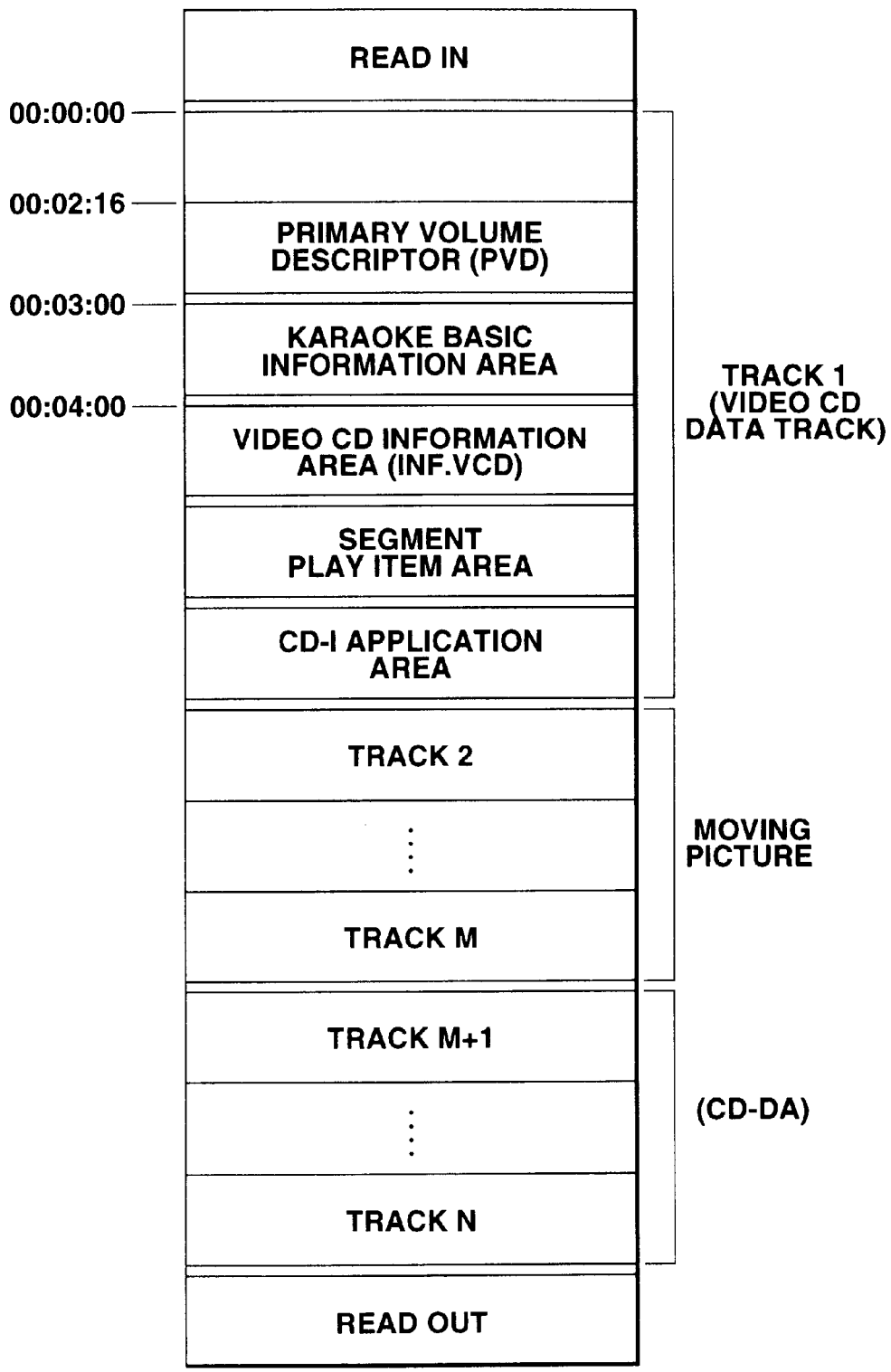
FIG. 11 is an explanatory view of recording format of a hybrid video CD .

The recording format of the respective hybrid video CD is described more concretely by using FIG. 11. The recording format of the hybrid video CD is classified roughly by the read-in area, the data area (tracks 1 through N) and the read-out area. In the example of FIG. 11, the moving picture data is recorded on the tracks 2 through M and the data of the CD-DA is recorded on the tracks M+1 through N.

Figure 1:
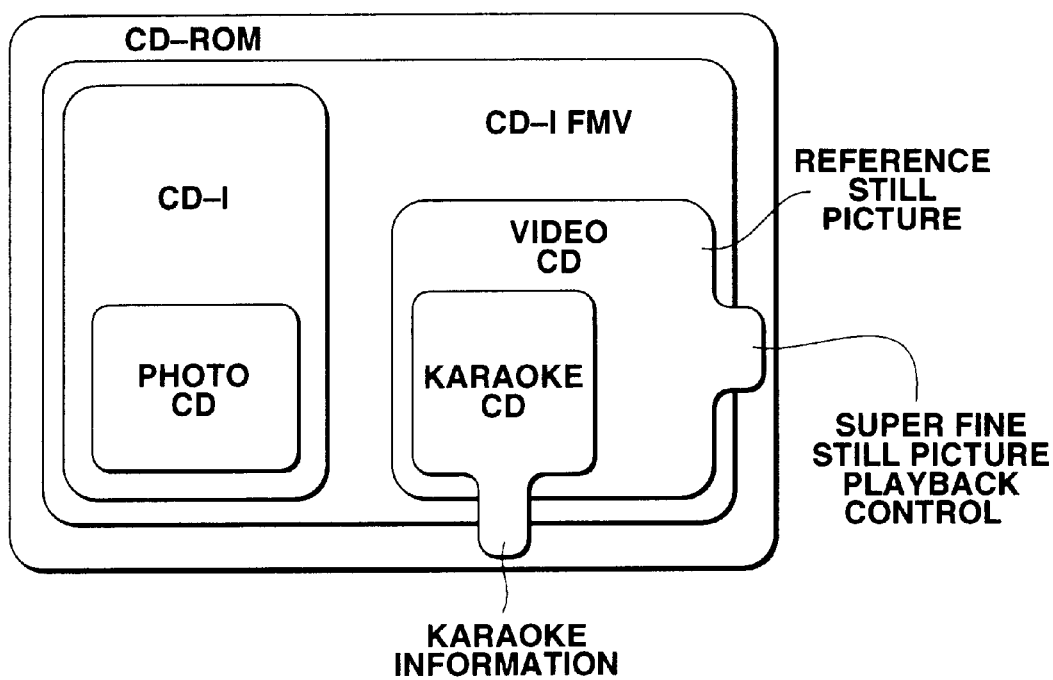
FIG. 1 is an explanatory view of the whole structure of the reference of a CD-ROM.
Figure 2:
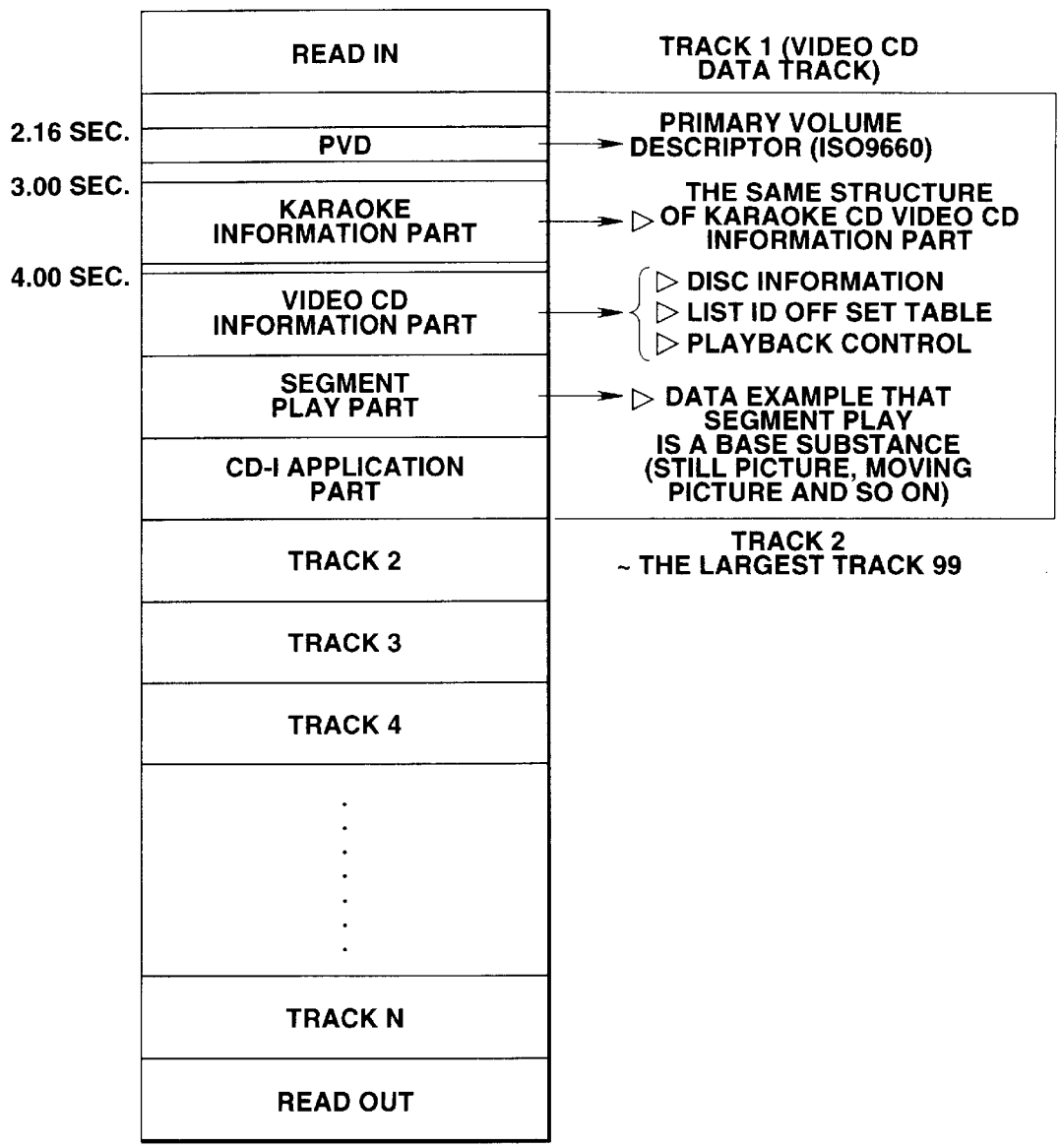
FIG. 2 is an explanatory view of format of recording of a conventional video CD.
Figure 3:
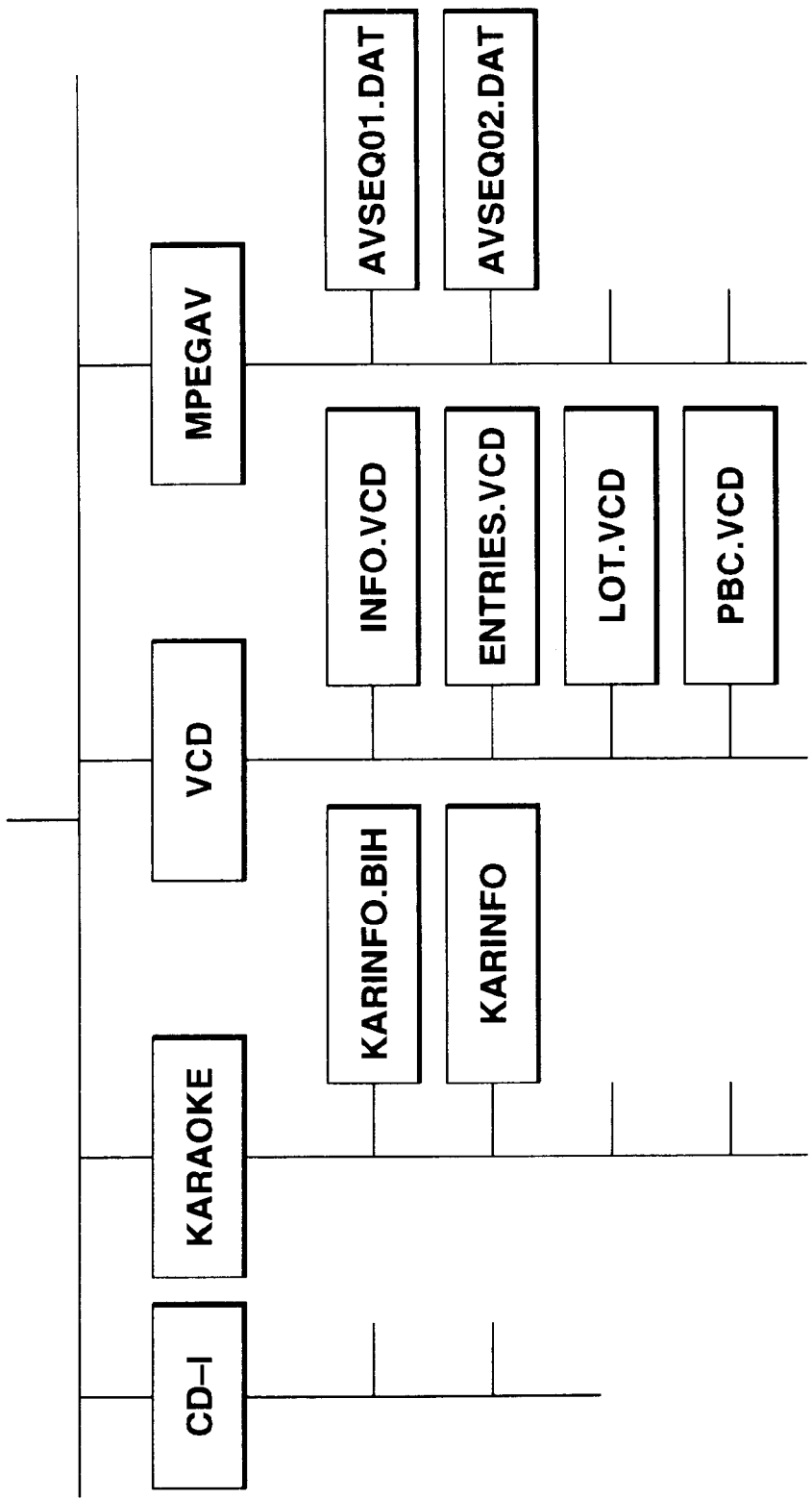
FIG. 3 is an explanatory view of the structure of the directory of a disk.
Figure 4:
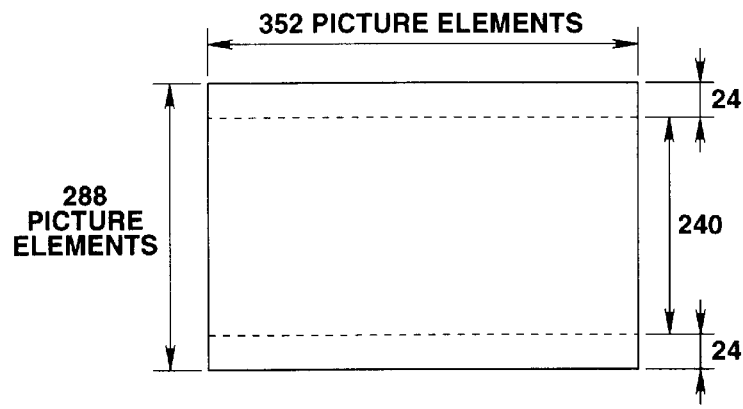
FIG. 4 is an explanatory view of a size of a picture of a video CD.
Figure 5:
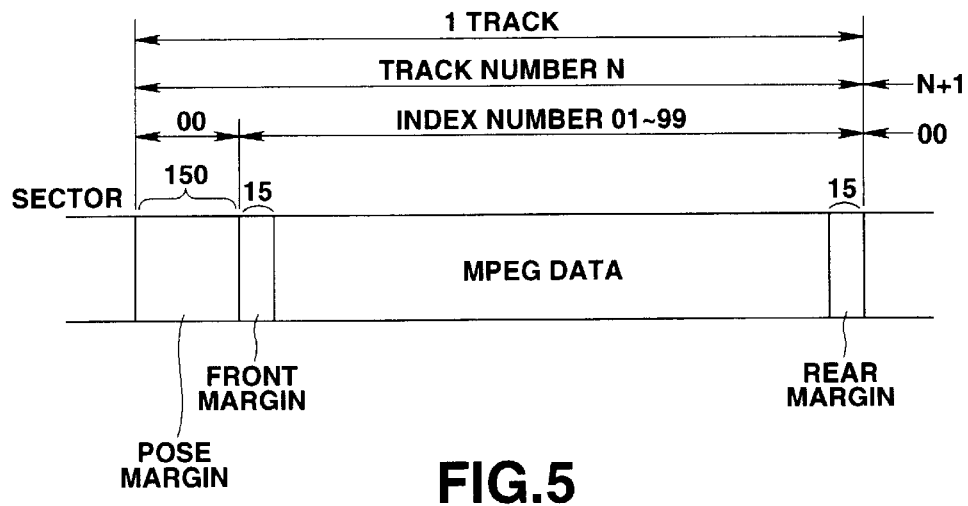
FIG. 5 is an explanatory view of the structure of the track of a video CD.
Figure 6:
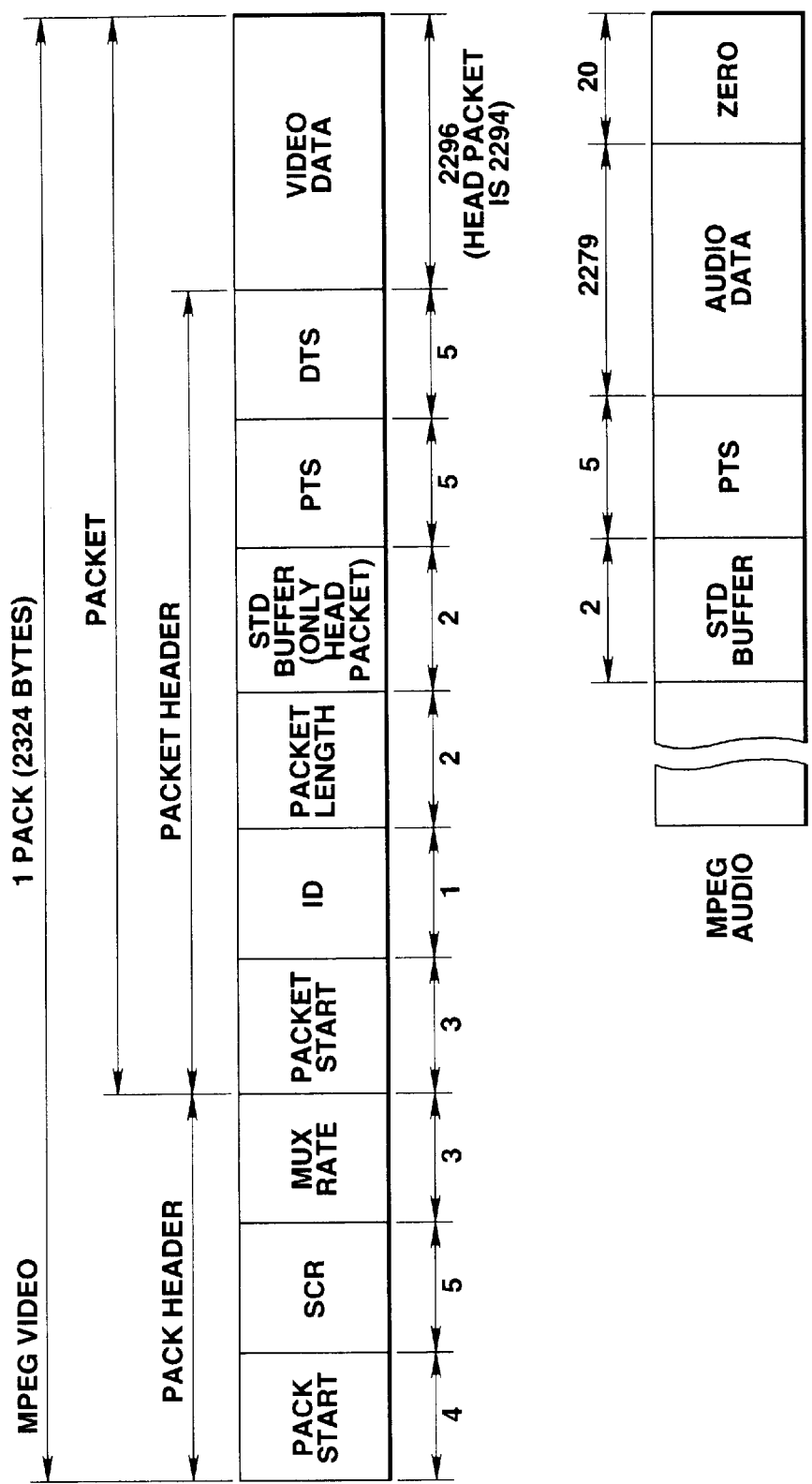
FIG. 6 is an explanatory view of format of MPEG video data recorded into a video CD and format of MPEG audio.

The track 1 is the video CD data track, and the video CD data information part (INF VCD) is provided to the CD-ROM XA reference similar to the conventional video CD that the recording format is shown in FIG. 2.

In the video CD information area (INF VCO) of the respective hybrid video CD as shown in FIG. 11, disk information, an entry table, a list ID off-set table (LOT), a play sequence descriptor and so on are recorded as each kind of disk information. The disk information is the information for recognizing the video CD, the entry table is the table for showing an entry point, the list ID offset table shows an address of a playback list, the play sequence descriptor includes the playback list and the data for controlling. Still, references of a primary volume descriptor part (PVD), a karaoke basic information area, a segment play item area and so on of the track 1 are the same as usual.

On one hand, in the CD-I application area of the track 1 of the respective hybrid video CD, the following programs are recorded as the application programs of the hybrid video CD reference.

As, for example, the program for making the video CD possible to play back under the environment of operating of the OS (the operating system) for the personal computer, the MPEG1 software decoder for decoding the picture and the sound data compressed and recorded by the MPEG1 stored into the video CD and its control software are included, in case that the MPEG1 decoding board for forming the hardware is not installed, the video CD reproducing program necessary for forming the moving picture playback part 123, the file "AUTORUN. INF" for starting automatically the program as below mentioned, and the Plug-in installed into the function extension part 122 and so on are stored. Still, in case that this program operates on, for example, the Windows 95 (a trademark of the OS of Microsoft Corporation in the U.S.A.), it is stored under the directory named, for example, "Win." The directory structure and the directory name under this directory are free. Concerning the data coexisting with other platform, the directory for the data is provided and is stored under the respective directory. The directory structure and the directory name under this directory for this data are free. Of course, the OS that is an object of operating is not limited to the Windows 95. Further, it is possible to correspond to the plural OSs. In this case, it is necessary to give each directory name so that the directory name is not batched. The program and so on, depending on the OS, is stored under the corresponding directory, respectively.

Next, the file (AUTORUN. INF for realizing the program autorun function recorded in the CD-I application area of the track 1 will be described. The program autorun function, at a point of time when the hybrid video CD, the CD-ROM, the conventional video CD and so on are inserted into the personal computer, recognizes automatically kinds of them and runs automatically the necessary program. Therefore, it is not necessary for users to run the program, for example, by double click an icon and so on. In order to realize the program autorun function, the representative file for the program autorun (the file name of this file is, for example, "AUTORUN. INF" as follows.) is stored in, for example, the route directory. AUTORUN. INF is, for example, a text file, and the program name to be run is described in inserting the disk such as the CD. The inside of AUTORUN. INF is divided into plural vender group sections, and the vender group includes the line that the vender name is described by enclosing by double quotation marks and the vender native line more than 0 line following it. The vender native line defines, for example, the program filename (the file name of this file is, for example, open as follows) to be run automatically, and the icon file name (the file name of this file is, for example, icon as follows) in case of displaying the disk such as the CD by the icon. Describing more concretely, in the open file, the programs for executing work, for example, for searching whether there is the netscape navigator or not, for searching whether the Plug-in is installed or not, for installing if not installed, for searching the user environment, for running the Netscape Navigator, for transmitting the user environment information to the server and so on are stored. Further, for example, in case that the program is not wanted to run automatically when inserting, the disk, "=open" is not described in the file of "AUTORUN.INF" and only "icon=" is described. The disk is displayed by the icon assigned by con=Still, in order to avoid that the disk is recognized as only video CD even in case that the autorun function is not necessary, it is desired to put the AUTORUN. INF in the route directory. As another example for realizing the respective program auto-starting function, it is considered to use, for example, the Auto-Play function supported by the Windows 95 of Microsoft Corporation in the U.S.A.). Under the environment of the Windows 95, "autorun" is decided as the vender name.

Next, the operation of the information integrated display system of FIG. 7 in case of using the hybrid video CD will be described by using the flowchart of FIG. 12.

Figure 12:
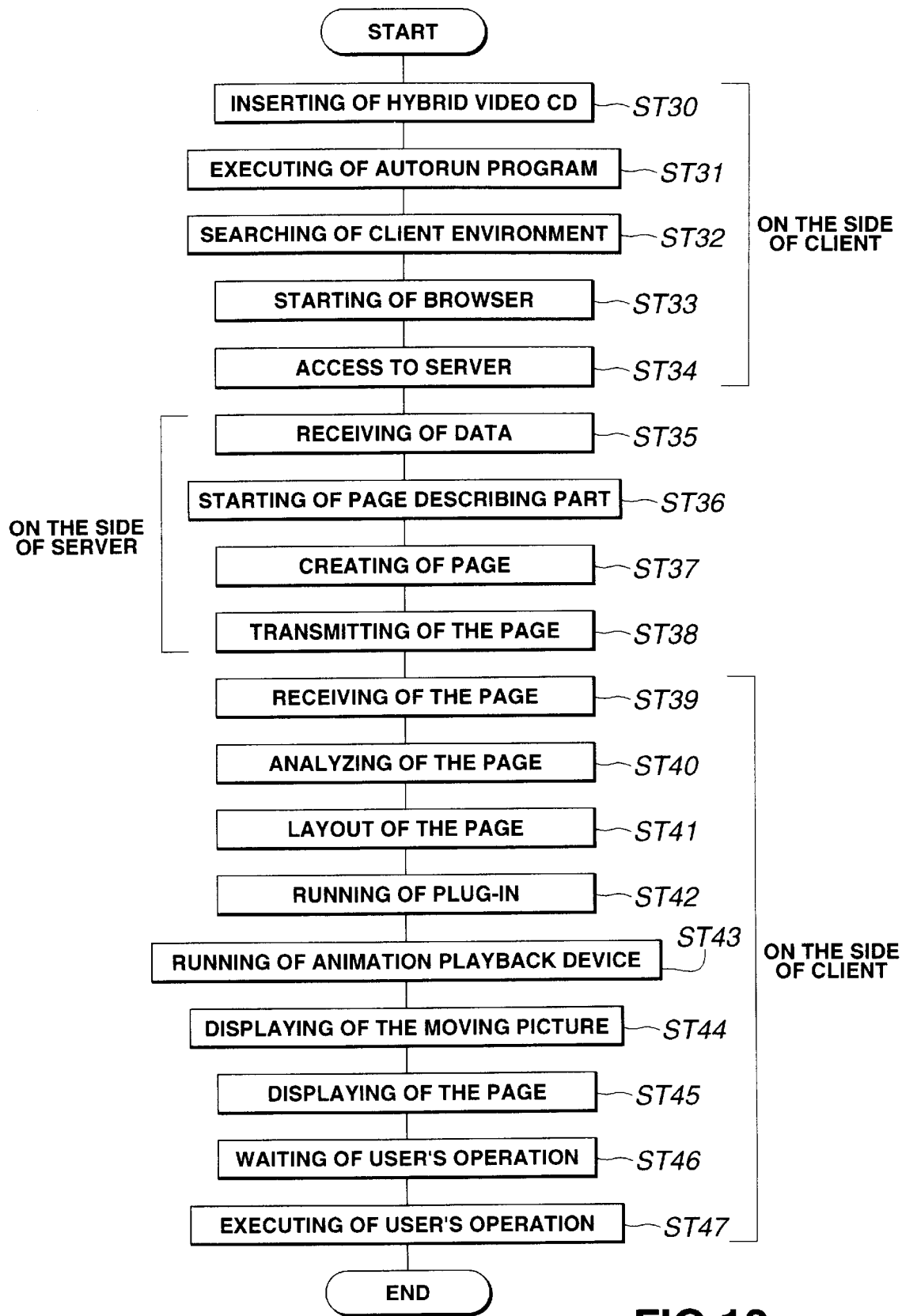
FIG. 12 is a flowchart of operation of an information integrated display system in case of using a hybrid video CD.

In FIG. 12, at the step ST30 the optical disk 126 is inserted into, for example, the storage device 125, that is, the hybrid video CD is inserted. At the next step ST31, the file of "AUTORUN. INF" for running automatically the program is read out of the CD-I application area of the respective inserted hybrid video CD and the program is executed. That is, in the respective file for automatically running the program, as above mentioned, the programs for executing work for, for example, searching whether there is the Netscape Navigator or not, for searching whether the Plug-in is installed or not, for installing if not installed, for searching the user environment (the drive name, the ID of the inserted disk and so on), for running the netscape navigator (running according to the information of the accessed URL (the server name, the program name and soon)), for transmitting the user environment information to the server and so on are stored, and the work is executed. Here, for example, at the step ST32 the information of the user environment (for example, the drive name, the ID of the inserted disk and so on) of the client terminal 120 is searched, at the next step ST33 the Browser 121 is started according to the information of the user environment, and at the step ST34 the fixed server 100 is accessed.

Next, at the communicating part 111 of the server 100, the program of the page describing part 112 is run at the step ST36 according to the respective received information when the information is received from the client terminal 120 at the step ST35. The page corresponding to the hybrid video CD inserted into the client terminal 120 is created at the step ST37 and the information of the respective created page is transmitted to the client terminal 120 at the step ST38.

The client terminal 120 analyzes the respective received page at the step ST40 when receiving the information of the page from the server 100 at the step ST39. At the step ST41, the layout is executed according to the description of the respective analyzed page. Here, if it is necessary to run the Plug-in, the Plug-in is run at the function extension part 122 as the step ST42. When the Plug-in is run, the moving picture playback part (the moving picture playback device) 123 is run at the respective run Plug-in as the step ST43. At the step ST44, the moving picture data played back by the moving picture playback part 123 is displayed at the fixed position according to the description of the page.

The Browser 121 displays the page after running the Plug-in as the step ST45, then waits the user's operation at the step ST46. Then, when the user operates something, it is executed. When, for example, the page switching operation is executed under the state of waiting the user's operation, the process after the step ST34 is repeated, however, the information transmitted to the server 100 then depends on the user's operation and is various of IDs of the titles stored into the hybrid video CD and the user's names.

As above mentioned, in the information integrated display system of the embodiment of the present invention, for example, the information of the picture and so on that are supplied by the optical disk and that amount of data is large and the renewal period is comparatively short (or unrenewal), and the information of the text that the renewal period is short and so on are acquired from the server, and the document is created by combining such information. Therefore, it is possible to use the information which the user has, to reduce the network load, to reduce sensing remote or local when inspecting the document, to seamlessly provide the combined information using the environment and to realize an advance of operativeness.

In the present invention, it is possible to display unifiedly renewal information which is acquired from a server through a wide area network and is renewed at any time and an unrenewal information which is individually held on the side of a client. It is therefore always possible to provide the latest information by describing the position of each information which the display contents include by a common page describing language and by displaying the renewal information acquired from the server by using a common language decoding display means and the unrenewal information held on the side of the client in the same display area. It does not take a longtime to acquire the respective information even if the information of a picture (particularly a moving picture) is contained in the acquired information. Further, the lead of the network is small, and it is possible to edit and display by combining organically the information that a user's terminal itself has with the information that the server has.

What is claimed is:

1. An information integrated display method, comprising the steps of:
    transmitting ID information specifying to a server's side unrenewal information stored on a client's side;
    creating on the server's side renewal information relating to said transmitted ID information and sending the renewal information to the client's side, the sent renewal information consisting of updates to the unrenewal information; and
    displaying the renewal information acquired from said server's side and the unrenewal information stored on the client's side in the same display area by using a common language decoding display means on the client's side.

2. The information integrated display method according to claim 1, wherein said renewal information is described by a prescribed page describing language for describing a hyper text format document, said language decoding display means is a browser for a system for providing prescribed information to inspect information possible to be used on the wide area network by hyper text format, and said renewal information described by said page describing language by the browser is described.

3. The information integrated display method according to claim 2, wherein said language decoding display means secures the display area and displays said unrenewal information according to assignment of a displayed file name described by said page describing language, a displayed file format and the displayed area.

4. The information integrated display method according to claim 3, wherein said language decoding display means runs a necessary function of preset extension functions according to the displayed file format described by said page describing language.

5. The information integrated display method according to claim 2, wherein said wide area network is the Internet, said server is a server corresponding to a prescribed information providing system, the renewal information is requested from said server by using a prescribed format for assigning a place for storing information resources dispersed on said Internet.

6. The information integrated display method according to claim 1, wherein the unrenewal information held individually on the side of said client terminal is information read out of read-only memory optical disk.

7. The information integrated display method according to claim 1, wherein said unrenewal information is moving picture information in which said compressed and encoded moving picture data, played back from the optical disk having recorded thereon at least the compressed and encoded moving picture data, are expanded and decoded.

8. An information integrated display system, comprising:
    a client terminal having an unrenewal information storage means for storing unrenewal information, an ID information creating means for creating ID information for specifying the respective stored unrenewal information, a transmitting and a receiving means for transmitting and receiving information and a display means for displaying the information; and
    a server having a renewal information storage means for storing renewal information renewed at any time, a transmitting and a receiving means for transmitting and receiving information, and a renewal information creating means for creating related renewal information according to said ID information transmitted from said client terminal, wherein the renewal information consists of updates to the unrenewal information, and wherein the renewal information acquired from said server and the unrenewal information stored on a side of the client terminal is displayed in a same display area of said display means by using a language decoding display means common to a side of said server and the side of the client terminal.

9. The information integrated display device according to claim 8, wherein said renewal information is described by a prescribed page describing language for describing a hyper text format document, said language decoding display means is a browser operative to inspect hyper text formatted information used on the wide area network, and said renewal information is described by said page describing language.

10. The information integrated display device according to claim 9, wherein said language decoding display means secures a display area and displays said unrenewal information according to assignment of a displayed file name described by said prescribed page describing language, a displayed file format and the displayed area.

11. The information integrated display device according to claim 10, wherein said language decoding display means runs a necessary function of preset extension functions according to a displayed file format described by said prescribed page describing language.

12. The information integrated display device according to claim 9, wherein said wide area network is the Internet, said server is a server corresponding to said prescribed information providing system, the renewal information is requested from said server by using a prescribed format for assigning a place for storing information resources dispersed on said Internet.

13. The information integrated display device according to claim 8, comprising:
    a disk drive operative to play back a read-only memory optical disk, wherein said unrenewal information is information read out of said read-only memory optical disk by said disk drive.

14. The information integrated display method according to claim 8, further comprising:
    expanding decoding means for expanding and decoding compressed and encoded moving picture data; and
    a disk drive operative to play back a read-only memory optical disk, wherein said unrenewal information is compressed and encoded moving picture data that is recorded on said optical disk, and said compressed and encoded moving picture data is expanded and decoded by said expanding decoding means.

\* \* \* \* \*